United States Patent [19]
Mizukami et al.

[11] Patent Number: 5,501,312
[45] Date of Patent: Mar. 26, 1996

[54] CLUTCH ASSEMBLY CONE SPRING HAVING WEAR PROTECTION MEANS

[75] Inventors: Hiroshi Mizukami, Neyagawa; Koji Kajitani, Tsuzuki; Keisuke Fujimoto, Hirakata; Norihisa Uenohara, Ibaraki, all of Japan

[73] Assignee: Kabushiki Kaisha Daikin Seisakusho, Osaka, Japan

[21] Appl. No.: 291,650

[22] Filed: Aug. 16, 1994

[30] Foreign Application Priority Data

Aug. 25, 1993 [JP] Japan .................. 5-046236 U
Aug. 25, 1993 [JP] Japan .................. 5-046237 U
Aug. 25, 1993 [JP] Japan .................. 5-046238 U

[51] Int. Cl.⁶ .................................. F16D 13/48
[52] U.S. Cl. ........................ 192/89.23; 192/109 A
[58] Field of Search ................ 192/89.23, 89.24, 192/89.22, 109 A

[56] References Cited

U.S. PATENT DOCUMENTS

| | | |
|---|---|---|
| 4,254,853 | 3/1981 | Huber .................. 192/89.23 X |
| 4,602,708 | 7/1986 | Nagano . |
| 4,949,829 | 8/1990 | Tojima et al. . |
| 4,951,553 | 8/1990 | Kohno . |
| 5,022,508 | 6/1991 | Fukuda . |
| 5,088,584 | 2/1992 | Inaba et al. . |
| 5,301,782 | 4/1994 | de Briel et al. .......... 192/89.23 |
| 5,400,887 | 3/1995 | Mizukami et al. ........ 192/70.27 X |

FOREIGN PATENT DOCUMENTS

| | | | |
|---|---|---|---|
| 3304711 | 8/1984 | Germany ............... | 192/89.23 |
| 4132349 | 4/1992 | Germany ............... | 192/89.23 |
| 2144496 | 3/1985 | United Kingdom . | |
| 2172670 | 9/1986 | United Kingdom ... | 192/89.23 |

*Primary Examiner*—Rodney H. Bonck
*Attorney, Agent, or Firm*—Shinjyu Office of Patent Attorneys

[57] ABSTRACT

A clutch cover assembly 3 having a disk-shaped clutch cover 4, an annular pressure plate 5, a cone spring 6, and a diaphragm spring 7. The pressure plate 5 is disposed in the clutch cover 4 and has a pressing surface 5a. The cone spring 6 is disposed on the opposite side of the pressure plate 5 in the clutch cover 4, and has its radial inner end supported on the clutch cover and its radial outer end biasing the pressure plate 5. Within the clutch cover, a hardened support member coupled to the cover is provided to engage at least one inner portion of the cone spring 6 in order to minimize wear associated with engagement with the spring 6 as it moves in response to movement of the pressure plate 5. The hardened support member is provided in the present invention is a number of forms. In one embodiment the hardened support member is integrally formed with the clutch cover 4. In another embodiment the hardened support member is a ring 10 formed with a lip 10a which engages a displaceable end of the cone spring 6.

11 Claims, 5 Drawing Sheets

CLUTCH ASSEMBLY CONE SPRING HAVING WEAR PROTECTION MEANS

BACKGROUND OF THE INVENTION

The present invention relates generally to a clutch assembly having a hardened metal cone spring which biases a pressure plate into contact with a clutch friction disk, and more particularly, to a clutch assembly having means for protecting adjacent components of the clutch assembly from wear due to contact with the cone spring.

Typically, a clutch assembly is mounted on the flywheel of an internal combustion engine, or other rotary power source and is used to engage and disengage a clutch friction disk. The clutch friction disk is usually connected to a transmission. Engagement and disengagement of the clutch disk facilitates control of the transmission of power from the engine to the transmission. The clutch assembly includes the friction disk positioned adjacent to the flywheel, a clutch cover fixed to the flywheel, a pressure plate coupled to the clutch cover which may be selectively moved to engage and disengage the friction disk, and a biasing means for urging the pressure plate into engagement with the friction disk. A lever member mounted for pivotal movement to the clutch cover contacts the pressure plate and facilitates the movement of the pressure plate in and out of engagement with the friction disk.

The biasing means can be any of a variety of devices. For instance, the lever member may be in the form of a diaphragm spring and may provide all or just a portion of the biasing force. Additional biasing devices, such as a spring or series of springs may also be employed. One such spring is a conically shaped spring disk referred to as a cone spring. The cone spring is generally disposed inside the clutch cover for engagement with the pressure plate. The cone spring has one radial edge supported by the clutch cover and another radial edge pressing the pressure plate against the friction disk and flywheel.

Clutch cover assemblies which utilize cone springs have a variety of problems, such as the following:

1) The edge of the cone spring that abuts against a surface of the clutch cover slides relative to the clutch cover for each clutch engaging and disengaging operation. Since the surface hardness of the clutch cover is usually lower than that of the cone spring, an abutting surface of the clutch cover eventually experiences wear. As the clutch cover is worn, the pressing posture of the cone spring is changed due to the corresponding change in the dimensions of the clutch cover. As a result, the load characteristics of biasing responses of the cone spring are changed since the force imparted by the spring is dependent upon its relative displacement with respect to abutting surfaces.

2) In some clutch cover configurations, the cone spring is maintained in proper radial position by a stepped portion formed in the clutch cover. However, due to the nature of the manufacturing process which may include stamping, rolling or pressing the cover into the desired shape, usually requires the cover to have rounded contours. The rounded contours may not provide the cover with precise dimensions in a mass production process to the degree required for positioning of an element within the cover, such as a cone spring. Therefore, the cone spring cannot be reliably position, whereby the cone spring may, in some cases, radially move out of its proper position. Consequently, the effective load characteristics (the biasing force imparted to the pressure plate) of the cone spring are liable to change.

3) As the friction disk of the clutch assembly wears, the pressure plate moves closer to the flywheel, thus changing the relative positions of the various components of the clutch assembly. As the relative positions change due to clutch disk wear, the portion of the cone spring that engages the pressure plate also moves closer to the flywheel. As the friction disk continues to wear, it is possible for the cone spring to become disengaged or have limited engagement with the pressure plate, later causing an axial clearance between the contacting part of the cone spring and the pressure plate. As a result, the cone spring may develop a backlash or clearance either between the clutch cover and the cone spring or between the cone spring and the pressure plate. The clearance may allow the spring to vibrate, thereby producing abnormal sounds. Such sounds are a source of discomfort for the operator of the machinery equipped with the clutch assembly. In automotive applications, such noises are of extreme discomfort to a driver, and may lead the driver to believe there is a serious problem with his automobile, where no problem exists. Hence, such noises are undesirable.

SUMMARY OF THE INVENTION

An object of the invention is to reduce the wear which ofttimes develops in a clutch cover by continual contact with a cone spring made of a hardened metallic material, thereby stabilizing the load response characteristics of the cone spring.

Another object of the present invention is to improve radial positioning of the cone spring through out the life of a clutch cover thereby stabilizing the response characteristics of the cone spring.

Still another object of the present invention is to improve axial positioning of the cone spring throughout the life of the clutch cover in particular as an associated friction disk member begins to wear.

In one aspect of the present invention, a clutch cover assembly includes a clutch cover formed with a plurality of circumferentially spaced apart apertures, and a plurality of support pins, one pin disposed in each of the apertures in the cover. A pressure plate is concentrically disposed within the cover along side a diaphragm spring. The diaphragm spring is formed with a lever portion and a pressing portion, and is supported by the pins for pivotal movement within the clutch cover. At least one hardened support portion is disposed within the cover adjacent to the pins. A cone spring is disposed within the cover, between the diaphragm spring and the cover's inner surface. An inner radial edge of the cone spring engages the hardened support portion and the outer radial edge engages the diaphragm spring providing biasing for the pressure plate.

The hardened support portion is, in one embodiment, a work hardened portion of the clutch cover, formed near the apertures through which the pins extend. The inner radial edge of the cone spring contacts the work hardened portion.

In another embodiment, the hardened support portion is formed on a metallic ring disposed about the pins. The hardened support portion provides a positional restraint and a contacting surface for the cone spring.

BRIEF DESCRIPTIONS OF THE DRAWINGS

DETAILED DESCRIPTION OF THE DRAWINGS

Figure 1:
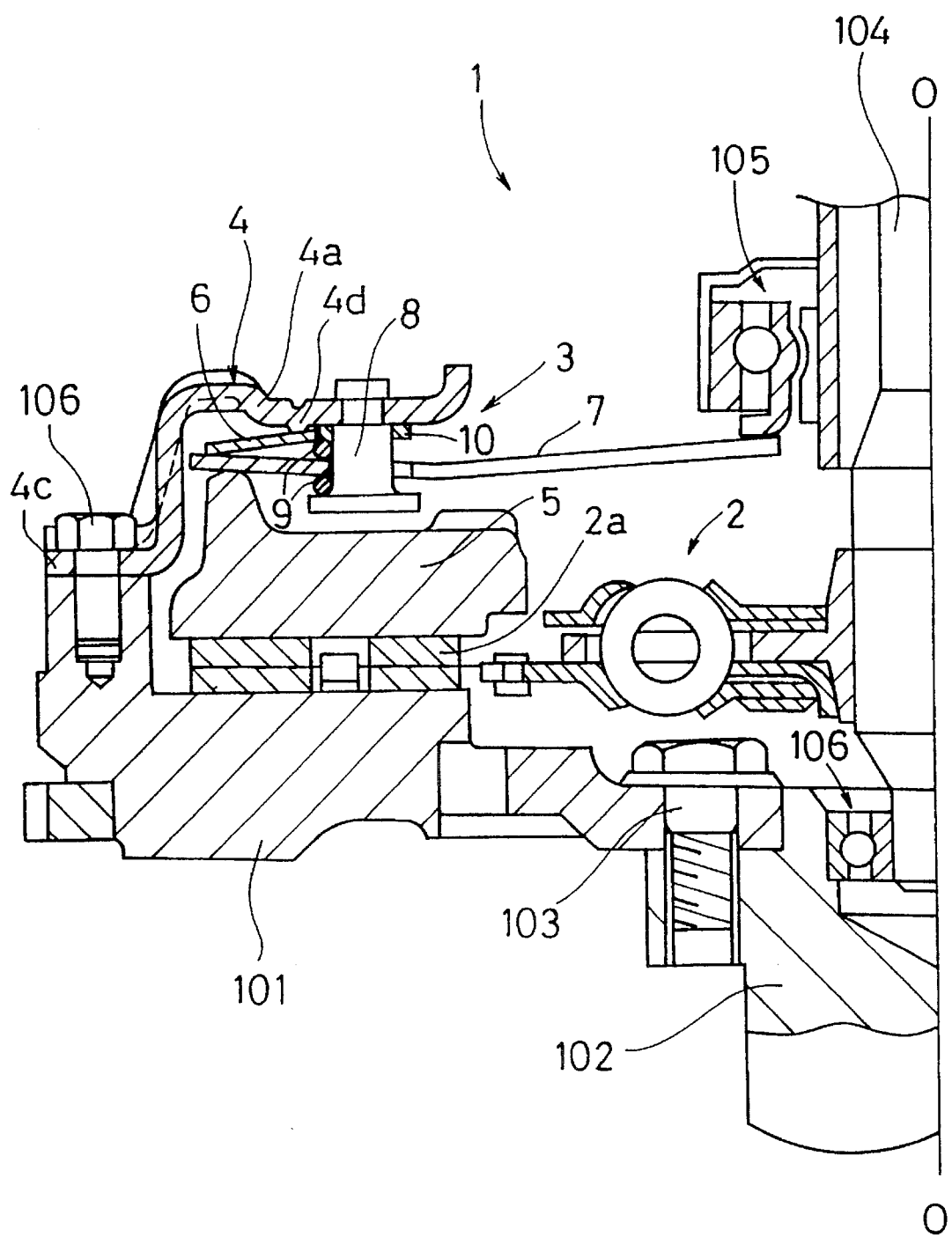
FIG. 1 is a fragmentary section of a clutch assembly according to a first embodiment of the present invention.

In FIG. 1, a clutch 1 is depicted that includes a clutch disk assembly 2 and a clutch cover assembly 3. A flywheel 101 serving as an input rotation member is fixed to a crankshaft 102 of an engine by a bolt 103. A main drive shaft 104 serving as an output member extends from the side of a transmission (not shown) and is spline fitted in a central portion of the clutch disk assembly 2, and an end of the main drive shaft 104 is rotatably supported on a central portion of the crankshaft 102 through a bearing 106. A release bearing 105 is disposed around a main drive shaft 4 so as to be axially movable. The clutch 1 is a push-type clutch disengaged when the release bearing 105 is pressed against a radially inner end of a diaphragm spring 7 (downwardly in FIG. 1), as is described below.

Figure 2:
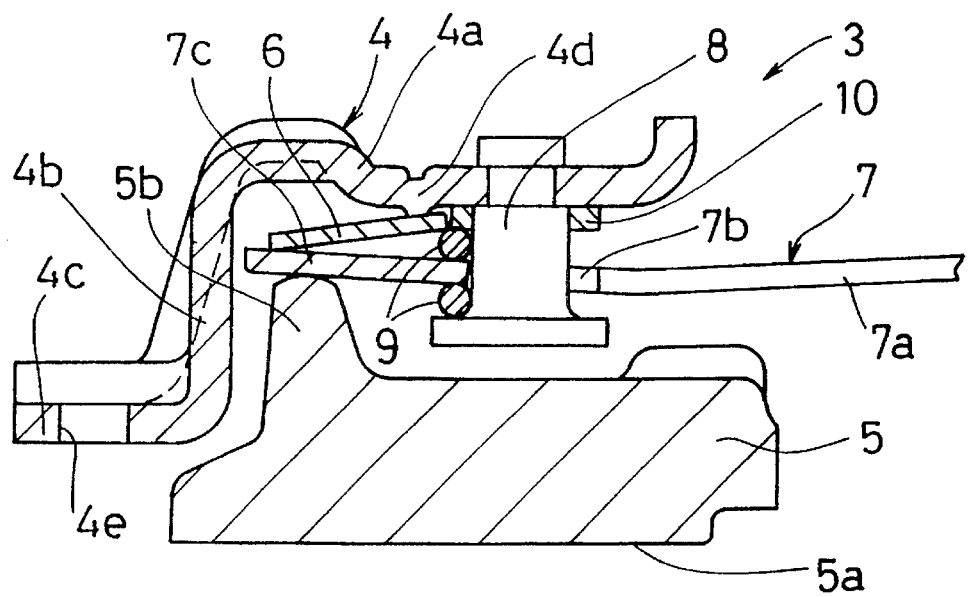
FIG. 2 is a portion of FIG. 1 on a slightly enlarged scale.

As shown in FIG. 2, the clutch cover assembly 3 includes a dish-shaped clutch cover 4 fixed to the flywheel 101, an annular pressure plate 5 disposed in the clutch cover 4, a cone spring 6 also disposed within the clutch cover 4 for urging the pressure plate 5 against the flywheel 101 in the clutch cover 4, a diaphragm spring 7 for releasing the biasing force of the cone spring 6 and urging the pressure plate 5 against the flywheel 101, two wire rings 9 retained by a plurality of stud pins 8 which are fixed to the clutch cover 4, and an annular support plate 10 fixed to the clutch cover 4.

With reference to FIG. 2, the clutch cover 4 may be manufactured from, for instance, a hot rolled mild steel plate such as Japanese specification metal SPHC (generally similar to ASTM A569-72, A621, A622, ISO 3573-76 or ISO 6317-82 or other such material). The clutch cover 4 is composed of a disk part 4a having a large diameter hole in its central portion, an axially extending cylinder part 4b extending from a radially outer end of the disk part 4a, and a radially outer flange 4c extending radially outward from the cylinder part 4b. A plurality of drawn parts 4d formed in the disk part 4a, which project toward the pressure plate 5. The parts 4d are formed in a plurality of places adjacent to the studs 8 and are circumferentially spaced apart from one another. Formed in the radially outer flange 4c is a hole 4e into which a bolt 106 (see FIG. 1) extends for fixing the clutch cover 4 to the flywheel 101. The hardness of the drawn part 4d is increased by work hardening during the manufacturing process which shapes the cover 4. The manufacturing process could be a cold pressing or deforming process or similar processes or could include any of a variety of known surface hardening procedures.

The pressure plate 5 is mounted on the clutch cover 4 through a strap plate (not shown) in a manner generally known in the art. The pressure plate 5 has a pressing surface 5a which contacts a facing member 2a on the clutch disk 2.

A plurality of radially spaced apart projections 5b are formed on the rear side of the pressure plate 5, opposite the side of the pressing surface 5a.

The diaphragm spring 7 is a lever member for releasing the pressing load of the cone spring 6, and the diaphragm spring 7 itself elastically presses the pressure plate 5 against the clutch disk 2. The diaphragm spring 7 is composed of an annular pressing part 7c and a plurality of levers 7a extending radially inward from the pressing part 7c. Between each lever 7a there is a slit defined by adjacent levers 7a. Radially outward of slits formed between the levers 7a, a plurality of holes 7b are formed. The stud pins 8 fixed to the clutch cover disk part 4a extend through each of the holes 7b, and the two wire rings 9 disposed circumferentially outward of the stud pins 8 abut against the upper and lower surfaces of the diaphragm spring 7. The two wire rings 9 serve as operational supports for the diaphragm spring 7. The release bearing 105 (see FIG. 1) abuts against an end of the levers 7a on the transmission side of the clutch 1.

With continued reference to FIG. 2, the pressing part 7c of the diaphragm spring 7 engages the projections 5b of the pressure plate 5 urging the pressure plate toward the flywheel 101. In an "at rest position", where the clutch disk 2 is engaged by the pressure plate 5, the spring 7 is supported by the wire ring 9 (the upper ring 9 in FIGS. 1 and 2). If the release bearing 105 presses the lever 7a toward the crankshaft 102, the pressing part 7c pivots upward in FIGS. 1 and 2, pivoting on the lower wire 9.

A plurality of arc-shaped support plates 10 are fixed to the stud pins 8 between the clutch cover disk part 4a and the upper wire ring 9 in FIG. 2. The support plates 10 are disposed with equal circumferential spacing, and are made of a material of SPHC similar to the clutch cover 4. It should be appreciated that the plates 10 could be individual washer like members, wherein one plate 10 is provided for each stud pin 8, or the plates 10 could be a single plate with apertures, one aperture for each stud pin 8. However, in the preferred embodiment, the arc-shaped plates described above are employed.

The cone spring 6 is disposed between the rear surface of the pressure plate 5 and the clutch cover disk part 4a. A radially outer end of the cone spring 6 engages and urges the pressing part 7c of the diaphragm spring 7 toward the pressure plate 5. In the construction and dimensioning of the present invention, the biasing force or load of the cone spring 6 and the biasing force or load of the diaphragm spring 7 are exerted in parallel on the pressure plate 5. The force verses displacement of each of the two springs 6 and 7 is combined in the present invention so that the peak of the characteristics of the cone spring 6 (the point at which the spring 6 exerts a generally maximum force) overlaps a minimum of the load characteristics of the spring 7 (a point where the force exerted by the spring 7 is minimal). As a result, the forces exerted on the pressure plate 5 tends to remain more generally constant throughout the life of the clutch assembly, i.e., the combined biasing force remains generally constant as the facing member 2a wears and its thickness diminishes.

Adjacent to the radially inner end of the cone spring 6, the cone spring 6 is axially supported on the plurality of drawn parts 4d formed in the clutch cover part 4a. In addition, a radially outer surface of the support plate 10 abuts against a radially inner edge of the radially inner end of the cone spring 6, whereby the position of the cone spring 6 is maintained within the cover 4. Further, the wire ring 9 on the upper side in the figures abuts against the radially inner end of the cone spring 6 on the side of the cone spring opposite the drawn parts 4d. That is, the radially inner end of the cone spring 6 is axially positioned by the upper wire ring 9.

The clutch device depicted in FIGS. 1 and 2 operates as follows. When the release bearing 105 is not pressing against the levers 7a of the diaphragm spring 7, the diaphragm spring pressing part 7c and the cone spring 6 urge the pressure plate 5 against the flywheel 101. As a result, the clutch 1 is engaged to transmit power between the shaft 102 and the transmission shaft 104. When the release bearing 105 is pressed against the lever 7a of the diaphragm spring 7, the pressing part 7c is moved in an upward direction in FIGS. 1 and 2, whereby the biasing force of the springs 6 and 7 against the pressure plate 5 is counteracted and no longer urges the pressure plate into engagement with the disk 2.

At the time of the foregoing operations, the radially inner end of the cone spring 6 slides relative to the clutch cover 4. Since the hardness of the drawn part 4d has been increased by work hardening or other such process in the manufacturing process, the clutch cover 4 is not easily worn down. Therefore, the posture or position of the cone spring 6 relative to the clutch cover 4 will not change significantly due to wear over an extended period of time, since the movement of the spring against the surface of the cover 4 should not result in appreciable wear. As a further result, the load characteristics of the cone spring 6 should remain generally constant throughout the useful life of the clutch 1.

Furthermore, the cone spring 6 is radially positioned by the hardened support plates 10. Accordingly, movement of the cone spring 6 is not likely since the support plates 10 are not likely to wear significantly throughout the life of the clutch 1. As a result, the position of the cone spring 6 and the load characteristics of the cone spring 6 should remain more generally constant throughout the useful life of the clutch 1.

Over a period of time as the clutch engagement and disengagement operation is repeated, the clutch disk facing 2a becomes worn. As the facing 2a wears, the pressure plate 5 moves toward the flywheel due to the reduced thickness of the facing 2a. The radially outer end of the cone spring 6 is also moved toward the flywheel 101 as the pressure plate 5 moves toward the flywheel 101. Eventually, when the facing 2a has worn down enough, the cone spring 6 may become unstressed due to the increased distance between the pressing part 7c and the cover part 4a. The axial position of the radially inner end of the cone spring 6 is maintained by the upper of the two wire rings 9. Consequently, the cone spring 6 is less likely to develop backlash in the axial direction, so that the propagation of abnormal sounds due to movement or vibration of the cone spring 6 is unlikely.

Figure 3:
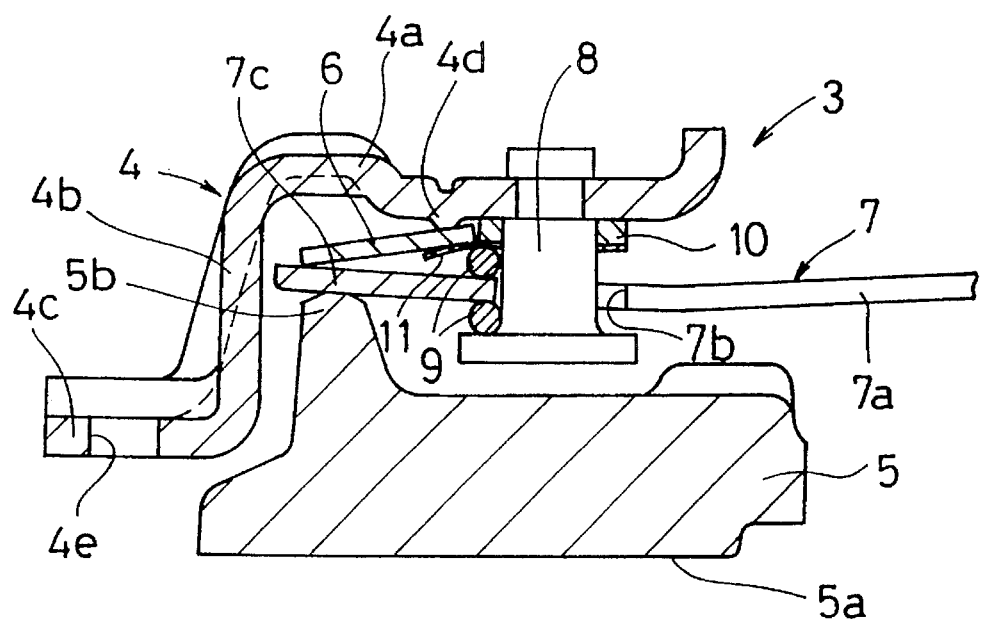
FIG. 3 is a view, similar to FIG. 2, of a clutch assembly according to a second embodiment of the present invention.

A clutch cover assembly according to a second embodiment of the present invention is depicted in FIG. 3. In the second embodiment, many of the elements described above with respect to the first embodiment are present, such as the pressure plate 5, the cover 4, drawn parts 4d on the cover 4, the diaphragm spring 7, the cone spring 6, the stud pins 8 and the support plates 10, among other elements.

Figure 4:
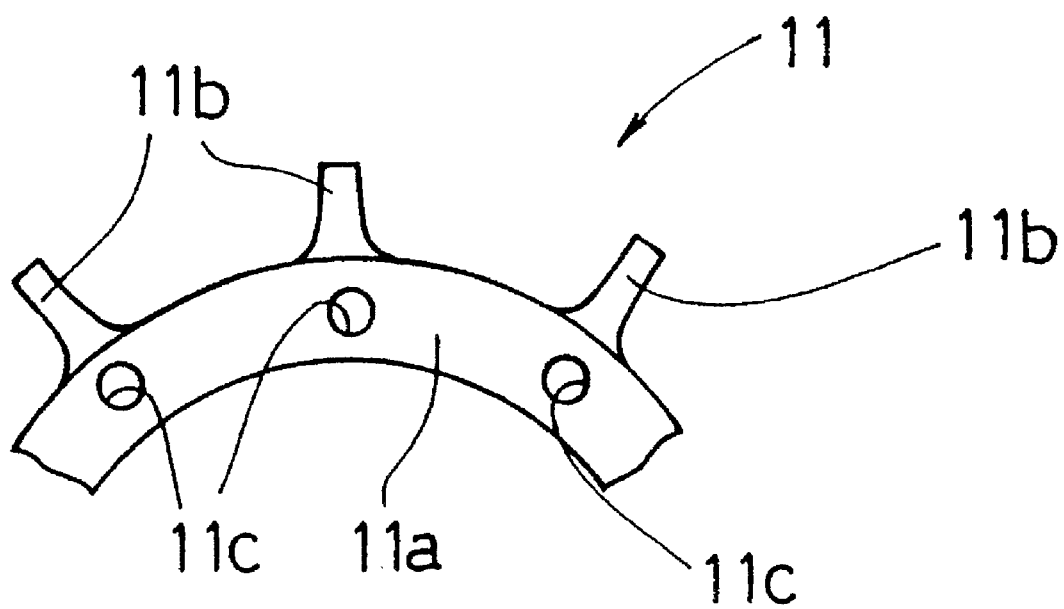
FIG. 4 is a fragmentary elevation of a support plate shown removed from the embodiment depicted in FIG. 3.

In addition, the clutch assembly also includes a secondary support plate 11 disposed between the support plates 10 and the wire ring 9 (the upper ring in FIG. 3). The secondary support plate 11 can be a single plate or it can be a plurality of arc-shaped members each composed of a thin steel plate. In the second embodiment three arcuate segment make up the secondary support plate 11, each segment having a plurality of apertures, one aperture for each stud pin 8. A portion of one of the three plates 11 is depicted in FIG. 4. The secondary support plate 11 is formed with an arc-shaped portion 11a and a plurality of catching parts 11b which extend radially outward from the arc-shaped portion 11a. Holes 11c through which stud pins 8 extend are formed in the arc-shaped portion 11a. The catching parts 11b abut against a radially inner end of the cone spring 6, as can be seen in FIG. 3, to axially position the cone spring.

A clutch cover according to a third embodiment of the present invention includes many of the same structural elements as that of the clutch assembly according to the first embodiment described with respect to FIGS. 1 and 2 and the second embodiment described with respect to FIGS. 3 and 4. For instance, as is shown in FIG. 5, the third embodiment includes a pressure plate 5, a cover 4, a diaphragm spring 7, the support rings 9 and a cone spring 6, among other elements.

Figure 5:
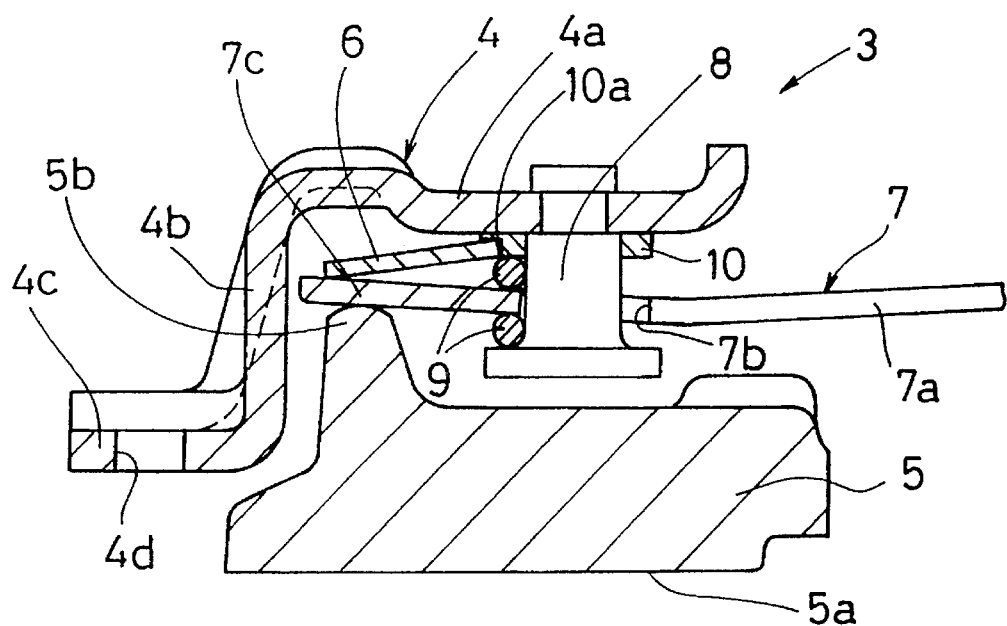
FIG. 5 is a view, similar to FIG. 2, of a clutch assembly according to a third embodiment of the present invention.

However, in contrast to the above described embodiments, the clutch cover 4 depicted in FIG. 5 does not include the drawn part 4d, as in the previous embodiments. Rather, each of the support plates 10 in the third embodiment are subjected to surface hardening such as hardening by a carburizing treatment or the like. Further, a radially outer portion of each support plate 10 is formed with a thin flange 10a that has a thickness that is less than the thickness of radially inner portion of the support plate 10. The flange 10a axially supports a radially inner end of the cone spring 6. In addition, a radially outer surface of the support plate 10 abuts against a radial inner surface of the cone spring 6, to radially support the cone spring 6. The support plate 10 axially supports and radially positions the radial inner end of the cone spring 6. The radial inner end of the cone spring 6 is axially positioned by the upper of the two wire rings 9.

Figure 6:
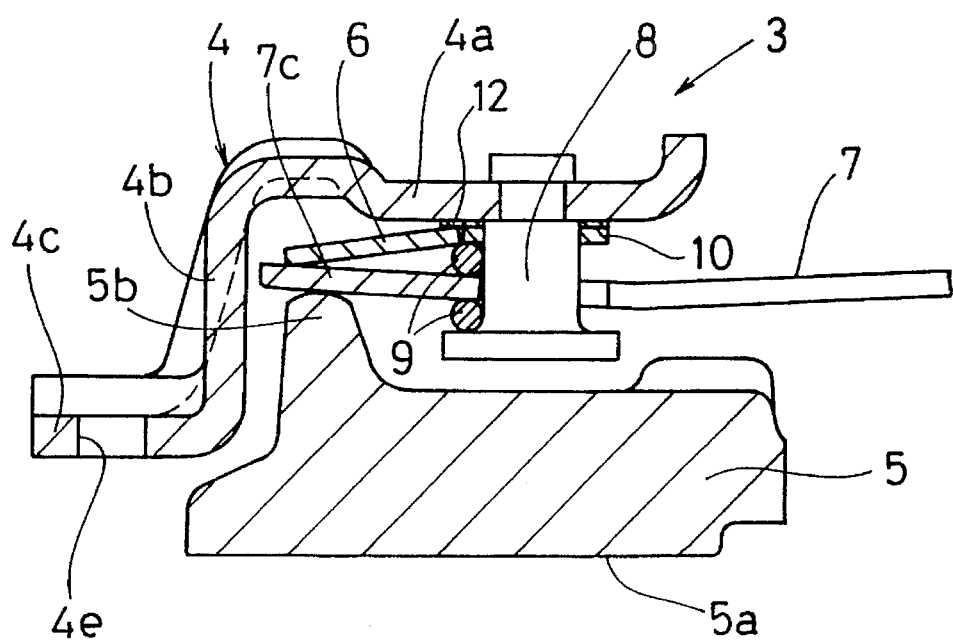
FIG. 6 is a view, similar to FIG. 2, of a clutch assembly according to a fourth embodiment of the present invention.

A clutch cover according to a fourth embodiment of the present invention includes many of the same structural elements as that of the previous embodiments. For instance, as is shown in FIG. 6, the fourth embodiment includes a pressure plate 5, a cover 4 formed without the drawn parts 4d, a diaphragm spring 7, the support rings 9 and a cone spring 6, among other elements. The support plates 10 in the fourth embodiment are as they were previously described in the first and second embodiments described with respect to FIGS. 1–4.

A secondary support plate 12 is disposed between the support plate 10 and the clutch cover disk part 4a in the fourth embodiment depicted in FIG. 6. The secondary support plate 12 is formed of a thin hardened steel material and may be in the form of a disk having apertures formed therein through which the stud pins 8 extend. The secondary support plate 12 may be a single ring-like disk or it may be a plurality of arcuate segments circumferentially spaced about the cover 4. In the present embodiment, there are three arcuate segments which constitute the support plate 12.

A radially outer end of the secondary support plate 12 axially supports a radially inner end of a cone spring 6. A radially outer surface of the support plate 10 abuts against the radially inner end of the cone spring 6, to radially position the cone spring 6.

In the clutch cover assembly depicted in FIG. 6, the support plate 10 need not be subjected to hardening by carburizing treatment, as suggested in one of the above described embodiments, when used in combination with the secondary support plate 12.

Figure 7:
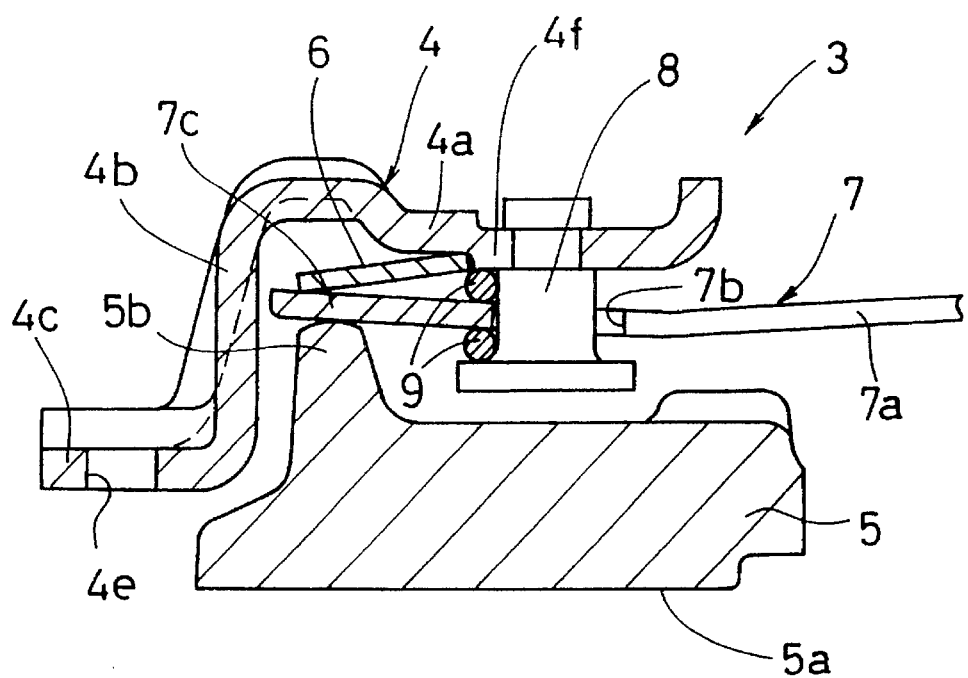
FIG. 7 is a view, similar to FIG. 2, of a clutch assembly according to a fifth embodiment of the present invention.

In a fifth embodiment of the present invention, depicted in FIG. 7, a clutch assembly includes may of the elements present in the above described embodiments, such as the cover 4, the pressure plate 5, the diaphragm spring 7 and the cone spring 6, among other elements. However, in the clutch assembly shown in FIG. 7, a circular shearing work formed projection 4f is formed in a radially inner portion of the clutch cover disk part 4a adjacent to the pins 8. The shearing work formed projection 4f extends toward the pressure plate 5, and abuts against the upper wire ring 9. In addition, a radially outer portion of the projection 4f radially positions a radial inner end of the cone spring 6. Further, the radially inner end of the cone spring 6 is axially supported by a portion of the clutch cover disk part 4a radially outward of the shearing work projection 4f.

In the present embodiment, the radial inner end of the cone spring 6 is axially positioned by the upper wire ring 9. The radially inner end of the cone spring 6 is supported by and radially positioned in place by the projection 4f. In the manufacturing process, when the clutch cover 4 is worked into its depicted shape, the portion of the steel sheet which is formed into the projection 4f is subjected to work hardening by the shaping process, which may include shearing work. Consequently, the area between the disk part 4a and the projection 4f, which supports the radially inner end of the cone spring 6 of the clutch cover 4 is not easily worn down. As a result, throughout the life of the clutch assembly, the position of the cone spring 6 relative to the cover 4 is not likely to change due to wear, thereby stabilizing the biasing characteristics of the cone spring.

Figure 8:
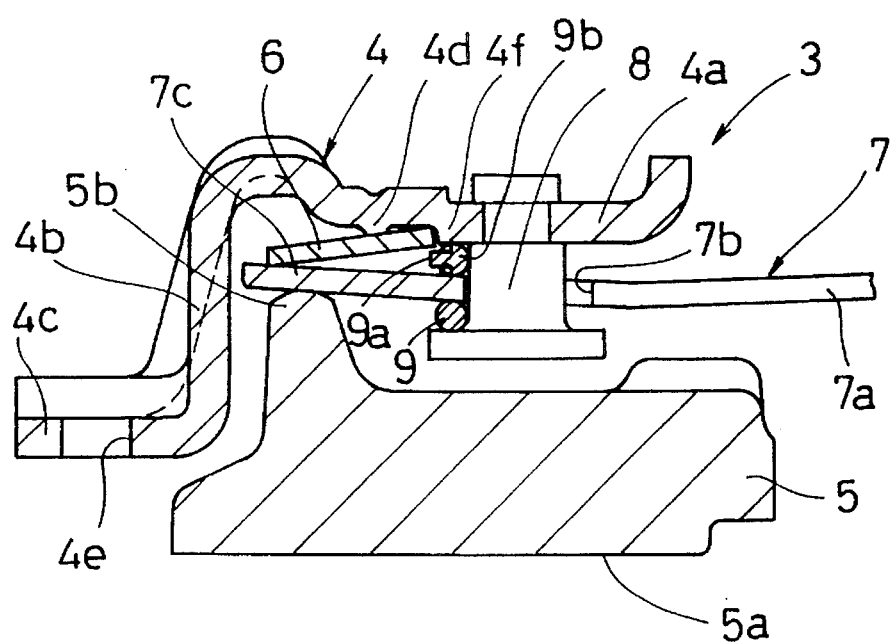
FIG. 8 is a view, similar to FIG. 2, of a clutch assembly according to a sixth embodiment of the present invention.

In a sixth embodiment of the present invention, shown in FIG. 8, many of the elements of the above described embodiments are also present, such as the cover 4, the drawn parts 4a on the cover 4, the projection 4f on the cover 4, the pressure plate 5, the cone spring 6, the lever diaphragm spring 7 and the stud pins 8, among other elements. The work hardening described above with respect to the projection 4f is also present in the sixth embodiment. Specifically, the cone spring 6 is axially supported by the drawn parts 4d, and radially positioned by the shearing work projection 4f.

A first wire ring 9 is provided between bottom portion of the stud pin 8 and the pressing part 7c of the diaphragm spring 7, as in the previous embodiments. However, catching parts 9a are formed on an upper wire ring 9b. The catching parts 9a are formed by subjecting portions of the wire ring 9b to a compression deformation process to cause the parts 9a to extend radially outward from the wire ring 9b. Such compression deformation work hardens those effected portions of the metal which constitutes the wire ring 9b. The catching parts 9a abut against a radially inner end of the cone spring 6 on the side of the pressure plate 5, whereby the radially inner end of the cone spring 6 is axially positioned reliably.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed:

1. A clutch cover assembly comprising:

a clutch cover attachable to a flywheel, said clutch cover provided with hardened support portions;

a pressure plate concentrically disposed within said cover;

a diaphragm spring having a lever portion and a pressing portion, said diaphragm spring coupled for pivotal movement to said cover, said pressing portion engaging said pressure plate, said pressing portion formed proximate an outer radial edge of said diaphragm spring;

a cone spring disposed within said cover between said diaphragm spring and an inner surface of said clutch cover, an inner radial edge of said cone spring engaging said hardened support portions and an outer radial edge of said cone spring engagable with said pressing portion for urging said pressure plate toward the flywheel.

2. A clutch cover assembly as set forth in claim 1 wherein said hardened support portions are formed integrally with said cover by a work hardening process.

3. A clutch cover assembly as set forth in claim 1 further comprising:

a plurality of support pins which extend through apertures formed in said diaphragm spring;

at least one support member mounted on said pins formed of a hardened material and defining said hardened support portions, engaging said inner radial edge of said cone spring.

4. A clutch cover assembly as set forth in claim 3 further comprising a secondary support member formed of a hardened material disposed between said support member and said cover, engaging said inner radial edge of said cone spring, and retained by said support pins.

5. A clutch cover assembly as set forth in claim 4 wherein said support member and said secondary support member are integrally formed.

6. A clutch cover assembly as set forth in claim 3 further comprising a secondary support member formed of a thin hardened metallic sheet material disposed about said pins adjacent to said support member to engage a surface of said cone spring proximate said inner radial edge of said cone spring to retain said cone spring in a position within said cover.

7. A clutch cover assembly as set forth in claim 1 further comprising:

a plurality of stud pins circumferentially disposed about said cover extending through said cover and said diaphragm spring thus supporting said diaphragm spring on said cover;

a first wire ring encircling said stud pins and configured to support said diaphragm spring.

8. A clutch cover assembly as set forth in claim 7 further comprising:

a second wire ring encircling said stud pins and configured to restrain movement of said cone spring.

9. A clutch cover assembly as set forth in claim 1 wherein said cone spring engages said pressing portion radially outward from where said pressing portion engages said pressure plate.

10. A clutch cover assembly comprising:

a clutch cover formed with a plurality of circumferentially spaced apart apertures;

a plurality of support pins, one pin disposed in each of said apertures in said cover;

a pressure plate concentrically disposed within said cover;

a diaphragm spring having a lever portion and a pressing portion, said diaphragm spring supported by said pins for pivotal movement with respect to said pins, said pressing portion engaging said pressure plate, said pressing portion formed proximate an outer radial edge of said diaphragm spring;

at least one work hardened support portion disposed within said cover adjacent to said pins;

a cone spring disposed within said cover, an radial edge of said cone spring engaging said work hardened support portion and an outer radial edge of said engagable with said diaphragm spring for biasing said presses plate.

11. A clutch cover assembly as set forth in claim 10 wherein said cone spring engages said pressing portion radially outward from where said pressing portion engages said pressure plate.

* * * * *